United States Patent [19]
Bart

[11] 3,991,507
[45] Nov. 16, 1976

[54] COLLAPSIBLE ORGANIZER RECEPTACLE FOR FISHING LEADER

[76] Inventor: Philip D. Bart, 46 Spinning Wheel Lane, Tamarac, Fla. 33313

[22] Filed: Sept. 2, 1975

[21] Appl. No.: 609,598

[52] U.S. Cl. .................................. 43/54.5 R
[51] Int. Cl.² ................................ A01K 97/00
[58] Field of Search .......................... 43/54.5 R

[56] References Cited
UNITED STATES PATENTS

| | | | |
|---|---|---|---|
| 2,253,598 | 8/1941 | Africa | 43/54.5 R X |
| 2,553,097 | 5/1951 | Lampe | 43/54.5 R X |
| 2,743,546 | 5/1956 | Crist | 43/54.5 R |
| 2,756,946 | 7/1956 | McAuley | 43/54.5 R X |

Primary Examiner—Louis G. Mancene
Assistant Examiner—Daniel J. Leach
Attorney, Agent, or Firm—Daniel M. Rosen

[57] ABSTRACT

A leader holder which provides an elongated corrugated shell axially compressible in a bellows-like manner along a series of alternating raised and lowered circumferential protrusions and depressions. Each of the depressions are separated from an adjacent protrusion by a continuous circumferential surface, each surface including a plurality of spaced apertures positioned about the length of the circumferential surface. The apertures are adapted to hold a length of leader therein, each of the leaders being contained entirely within one of the circumferential surface areas in an individual depression. A case is adapted to encase the shell, and to do so in a manner maintaining the shell in its axially compressible state.

3 Claims, 8 Drawing Figures

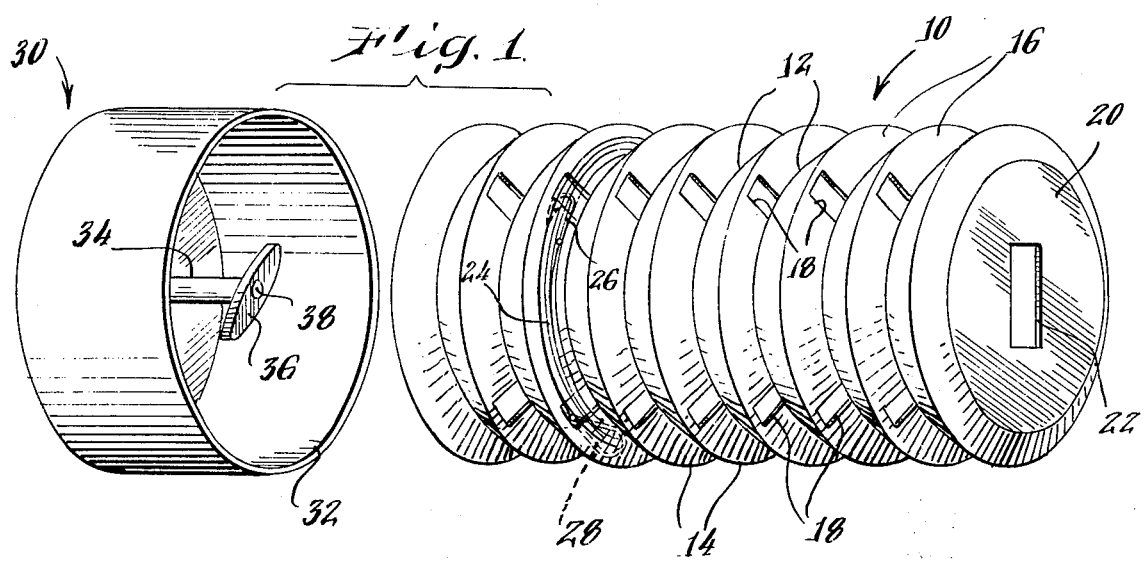
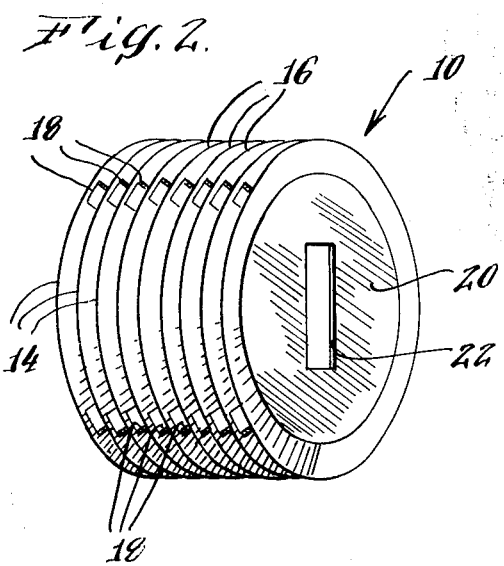
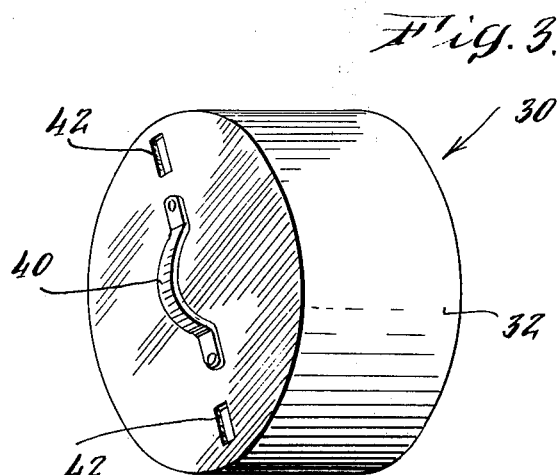
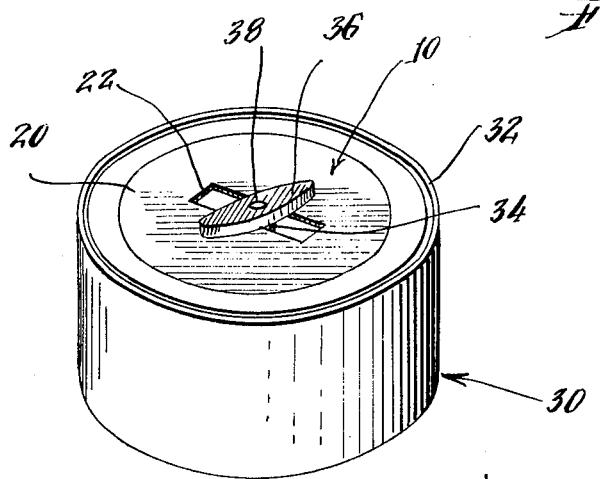
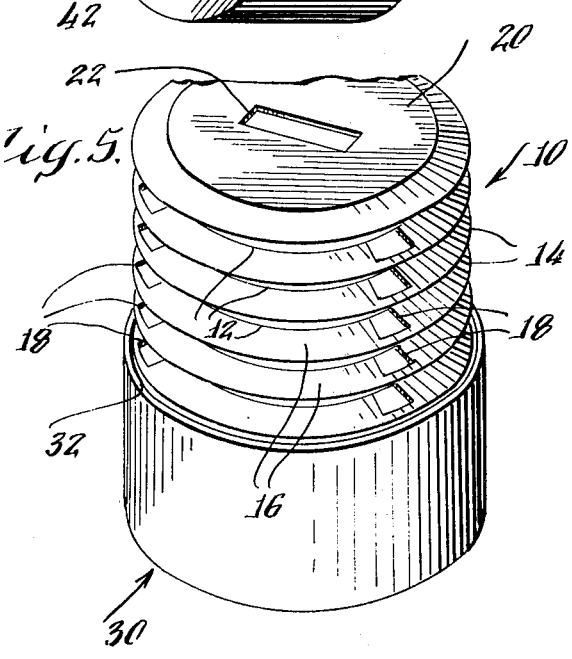

COLLAPSIBLE ORGANIZER RECEPTACLE FOR FISHING LEADER

THE INVENTION

The present invention relates to a container for holding fishing leaders and more particularly to collapsible constructions for holding fishing leaders and the like.

Prior art devices for holding fishing leaders have employed rigid elongated constructions employing correspondingly sized containers for encasing such rigid elongated structures. More often, leaders are merely thrown into a generalized fishing tackle box and as a result have a tendency to become entangled and knotted. Devices which maintain the leaders in separate areas about a central shaft, while inhibiting entanglement and knotting, do not fit in the average sized tackle box and thus tend to be impractical. This is particularly true where it is desired to hold large numbers of leaders.

It is thus the prime object of the present invention to provide a novel and unique leader holder which will maintain a number of leaders in separate, nonentangling relationships, while at the same time, allowing a large capacity of leaders to be maintained in a relatively small amount of space.

It is another object of the present invention to provide a device for holding pluralities of leaders in a manner inhibiting the formation of snarls and tangles, while at the same time enabling a large number of such leaders to be placed into a relatively small sized case for enclosure within a tackle box, or mounting upon a wall, or for being carried on a belt around the waist of the wearer.

The foregoing objects are realized in accordance with the present invention by a construction which provides for a leader holder in the form of an elongated corrugated shell axially compressible in a bellows-like manner along a series of alternating raised and lowered circumferential protrusions and depressions. Each of the depressions are separated from an adjacent protrusion by a continuous circumferential surface, each surface including a plurality of spaced holding means in the form of apertures or the like positioned about the length of the circumferential surface. The holding means are adapted to hold a length of leader therein, each of the leaders being contained entirely within one of the circumferential surface areas in an individual depression. A case is adapted to encase the shell, and to do so in a manner maintaining the shell in its axially compressible state.

The foregoing objects and brief description of the present invention, as well as further objects and advantages of the present invention, will become more apparent from the following more detailed description when taken in conjunction with the appended drawings wherein:

FIG. 1 illustrates a first embodiment of the leader holder and case in accordance with the present invention;

FIG. 2 illustrates a leader holder of the present invention in its axially compressed state;

FIG. 3 illustrates the left end of an embodiment of the case portion of the leader holder;

FIG. 4 represents an assembled view showing the leader holder in its axially compressible state being contained within the leader holder case;

FIG. 5 illustrates the case with the leader holder in its extended position;

It will be understood that similar reference numerals, where employed, indicate like parts throughout the several figures.

Figure 6:
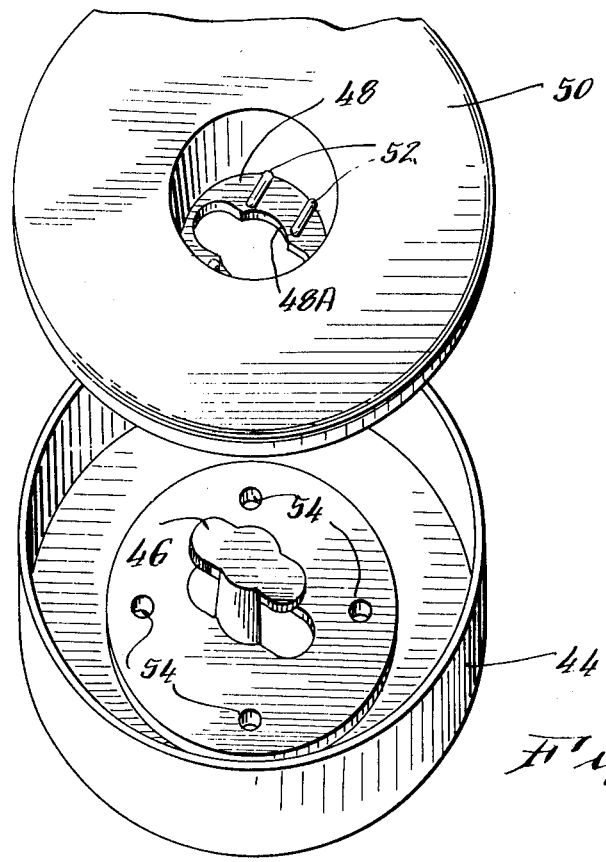
FIG. 6 illustrates a preferred embodiment of a case utilized in accordance with the present invention.

With reference to the figures, particularly as shown in FIG. 1, the body of the leader holder is an elongated corrugated shell 10 of axially compressible material such as a soft plastic or the like. A waterproof corrosion-resistant material is, of course, preferable in view of the environment for which the invention is intended. The shell 10 includes a plurality of alternating raised and lowered circumferential depressions 12 and protrusions 14. Between each respective depression and protrusion there exists a continuous circumferential surface 16 extending in a relatively planar manner about the circumference of the shell 10. On each continuous circumferential surface there is a plurality of spaced holding means 18 positioned in a direction circumferential with respect to the holder. At least two apertures are desirable, and it is preferable to have four spaced equally about the circumference. As shown, the holding means are a plurality of spaced apertures which may be rectangular, circular, triangular or any other shape, and may be formed in the wall of the shell by cutting, stamping, or preferably, punching. Although shown on only one side of the continuous circumferential surface 16, it will be apparent that the holding means 18 may be located on either or both of the facing sides of the space between the depressions and protrusions.

In the embodiment shown in FIG. 1, the shell 10 includes an end wall 20 having an elongated aperture 22 therein.

A length of leader 24 is placed into a depression 12 by inserting the hook end 26 over and through the holding means 18, thereby securing it to the circumferential surface 16 and winding the leader length 24 in an appropriate direction about the circumference of the shell 10 so as to fit within the depression region. When the looped end of leader 28 is reached, the looped end is inserted into one of the apertures 18. Although the looped end 28 is shown inserted into the next aperture relative to the hook end 26, it will be apparent that the use of the plurality of apertures about the circumference of the surface 16 enables the looped end to be inserted into any convenient aperture, including the same aperture as the hook end, as soon as the end of leader 24 is reached.

On the left hand side of FIG. 1, a case 30 is illustrated. The case is also constructed in a water-resistant but relatively stiff high impact plastic material or the like. The case 30 consists of an outer shell 32 and an interior central upstanding member 34 having coupled thereto a transversely positioned peg 36 secured to the central upstanding member 34 by means of a fastening mechanism 38. The fastening mechanism, although illustrated as a screw, may consist of an adhesive, or may in fact be molded out of the same material as the central upstanding member 34.

When the leaders are fully installed on the holder, each in its own depression region, the collapsible, bellows-like structure of the shell 10 may be compressed along its axial length into the shape illustrated generally in FIG. 2.

As shown in FIG. 3, the case 30 can include a plurality of openings 42 which allow drainage of any liquid which may be squeezed out of the holder by virtue of the compression of a recently used leader in place on the shell, or any other moisture which may form or result in conjunction with the intended environment or the like. Also positioned on the back of the case 30 is a strap-like member 40 which may be employed for hanging the leader on the side wall of a boat or hanging the leader holder from the belt of the wearer for portable use.

When in its axially compressed state, the shell 10 fits within the case 30 in the manner shown in FIG. 4. The peg 36 is allowed to pass through the correspondingly apertured end wall 20. The peg 36 is then turned, either alone or by turning the entire case end 30, in a manner securing the axially compressed holder 10 within the case 30 and more particularly within the exterior wall portion 32 of the case 30. When the peg 36 is rotated 90° in either direction, as shown in FIG. 4, the holder 10 can expand in accordance with its state of resilience in the manner illustrated generally in FIG. 5.

Figure 7:
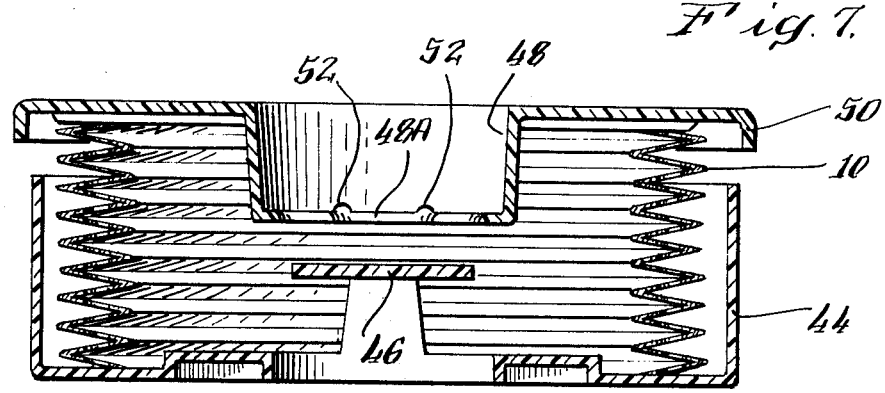
FIG. 7 illustrates a partial side cross-section of the elements of FIG. 6.

A preferred embodiment of the case mechanism is illustrated in detail in FIGS. 6 and 7. As shown therein, the case bottom 44 includes an upstanding portion 46 cooperating with a like-shaped but complementary slotted member 48 in a central depressed portion of the top 50 of the case, as shown in the upper portion of FIG. 6. When the shell 10 is axially compressed within the case bottom 44 it will fit within the case bottom and held in position by means of the case top 50 which is placed over the case bottom and rotated 90° to allow the end portions of the member 46 to engage a corresponding slot 48A in the slotted member 48 for holding the axially compressible holder 10 in position. Raised ridge members 52 serve to prevent inadvertent rotation from the closure position by frictional engagement. In the latter embodiment, it is evident that the end wall 20 shown in FIG. 1 and its corresponding aperture 22 is not a necessary element of the holder 10. FIG. 7 shows the top 50 positioned over the bottom 44, and being used to apply the axial pressure to the shell 10 for closure.

In the embodiment shown in FIGS. 6 and 7, drainage holes 54 and carrying elements may also be provided.

Figure 8:
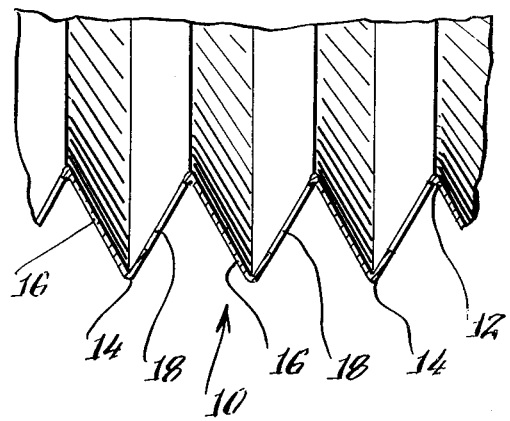
FIG. 8 shows a cross-section of a portion of the shell member.

As shown in FIG. 8, the shell 10 is a suitable plastic material which may be manufactured by suitable injection molding techniques from a single section of resilient plastic or other artificial material. The case members shown throughout may also be manufactured by suitable injection molding techniques from high impact relatively stiff plastic or like corrosion-resistant material.

Thus, what has been described is a means for portably containing a plurality of leaders in separable areas in a manner which permits portability as well as convenience and economy.

It will, of course, be understood that the invention is not limited to the embodiments described herein, there being further alternatives within the scope of the invention which will be apparent to those skilled in the art.

What is claimed is:

1. A leader holder comprising an elongated corrugated shell axially compressible, in a bellows-like manner, along a series of alternately raised and lowered circumferential protrusions and depressions, each said depression being separated from an adjacent protrusion by a continuous circumferential surface, and circumferential surface including therein a plurality of spaced holding means positioned about the length of said circumferential surface, said holding means adapted to hold therein a length of leader, said holding means being located entirely within said circumferential surface, a case, said case dimensioned to encase said shell in its axially compressed state, said case including a first end having a central upstanding member adapted to pass through the inner portion of said holder along its axial direction, and a second end adapted to secure said upstanding member to maintain said shell encased in said axially compressible state.

2. The holder of claim 1, wherein said second end includes a depressed central portion and a member therein complemental to said central upstanding member, said second end closing with said first end to enclose said shell by engaging said complemental member with said upstanding member.

3. The holder of claim 2, wherein said depressed central portion includes raised ridge members for frictionally engaging said central upstanding member for mounting said first end in fixed relationship with said second end.

* * * * *

UNITED STATES PATENT AND TRADEMARK OFFICE
CERTIFICATE OF CORRECTION

PATENT NO. : 3,991,507
DATED : November 16, 1976
INVENTOR(S) : Philip D. Bart

It is certified that error appears in the above-identified patent and that said Letters Patent are hereby corrected as shown below:

Column 4, line 24, delete "and" and insert --said--.

Signed and Sealed this

Thirty-first Day of May 1977

[SEAL]

Attest:

RUTH C. MASON
*Attesting Officer*

C. MARSHALL DANN
*Commissioner of Patents and Trademarks*